United States Patent
Bernard

(10) Patent No.: US 12,542,149 B2
(45) Date of Patent: Feb. 3, 2026

(54) METHOD AND APPARATUS FOR IMPROVING SPEECH INTELLIGIBILITY IN A ROOM

(71) Applicant: Dr. Ing. h.c. F. Porsche Aktiengesellschaft, Stuttgart (DE)

(72) Inventor: Benjamin Bernard, Karlsruhe (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 179 days.

(21) Appl. No.: 17/666,645

(22) Filed: Feb. 8, 2022

(65) Prior Publication Data
US 2022/0262389 A1   Aug. 18, 2022

(30) Foreign Application Priority Data
Feb. 12, 2021   (DE) .................. 10 2021 103 310.1

(51) Int. Cl.
*G10L 21/0364* (2013.01)
*G06V 40/16* (2022.01)
(Continued)

(52) U.S. Cl.
CPC ........ *G10L 21/0364* (2013.01); *G06V 40/176* (2022.01); *G10L 15/25* (2013.01); *G10L 21/0232* (2013.01); *G10L 25/84* (2013.01)

(58) Field of Classification Search
CPC . G10L 21/0364; G10L 15/25; G10L 21/0232; G10L 25/84; G10L 17/00;
(Continued)

(56) References Cited

U.S. PATENT DOCUMENTS 9,437,195 B2   9/2016 Nicholson et al.
10,163,432 B2  12/2018 Every
(Continued)

FOREIGN PATENT DOCUMENTS

CN   111833899 A    10/2020
DE   102017117569   2/2019
(Continued)

OTHER PUBLICATIONS

German Examination Report dated Aug. 18, 2023.
(Continued)

*Primary Examiner* — Paras D Shah
*Assistant Examiner* — Fouzia Hye Solaiman
(74) *Attorney, Agent, or Firm* — LEYDIG, VOIT & MAYER, LTD.

(57) ABSTRACT

A method for improving speech intelligibility in a room includes detecting an active speaker, or speech, identifying the active speaker, and influencing at least one apparatus for producing sound for the room in such a way that the level of sound emitted into the room by this apparatus is reduced at frequencies or in frequency ranges that tally with or are adjacent to the frequencies, or frequency ranges, of the speaker that are relevant to speech intelligibility, and/or influencing at least one apparatus for producing sound for the room in such a way that the level of sound transmitted into the room is reduced by at least one apparatus for reducing sound by destructive interference at the frequencies or in the frequency ranges that are relevant to the speech intelligibility of the speaker or at frequencies or in frequency ranges that are adjacent to the frequencies or frequency ranges.

11 Claims, 2 Drawing Sheets

(51) Int. Cl.
*G10L 15/25* (2013.01)
*G10L 21/0232* (2013.01)
*G10L 25/84* (2013.01)

(58) Field of Classification Search
CPC ..... G10L 25/78; G10L 21/0316; G10L 15/20; G10L 17/02; G10L 21/02; G06V 40/176; G06V 40/174; G10K 11/178; G10K 11/175
USPC ........................................................ 704/225
See application file for complete search history.

(56) References Cited

U.S. PATENT DOCUMENTS

| | | | |
|---|---|---|---|
| 10,803,857 B2 | 10/2020 | Rosenberg | |
| 12,051,441 B2 | 7/2024 | Zheng et al. | |
| 2004/0057584 A1* | 3/2004 | Kakuhari | G10K 11/17881 381/71.7 |
| 2010/0014685 A1* | 1/2010 | Wurm | G10K 11/17823 381/71.11 |
| 2016/0029111 A1* | 1/2016 | Wacquant | H04R 3/005 381/86 |
| 2018/0376108 A1* | 12/2018 | Bright-Thomas | G06V 20/40 |
| 2020/0184942 A1* | 6/2020 | Hakuta | B32B 15/04 |
| 2020/0251120 A1 | 8/2020 | Froehlich | |
| 2020/0372925 A1* | 11/2020 | Chen | G10L 21/0308 |
| 2020/0388285 A1* | 12/2020 | Spiewla | G06F 3/167 |
| 2020/0411025 A1 | 12/2020 | Karimi-Cherkandi et al. | |
| 2021/0076002 A1* | 3/2021 | Peters | H04N 7/152 |
| 2021/0264891 A1 | 8/2021 | Aval et al. | |

FOREIGN PATENT DOCUMENTS

| | | | |
|---|---|---|---|
| DE | 112018001396 T5 * | 2/2020 | |
| DE | 102020133448 A1 | 6/2022 | ............... B60R 1/00 |
| WO | WO-2018164699 A1 * | 9/2018 | ....... G10K 11/17837 |

OTHER PUBLICATIONS

British Combined Search and Examination Report dated Jul. 19, 2022.
German Search Report dated Aug. 18, 2021.
DeepL Translation for Raumverkleidungen Mar. 13, 2025.

* cited by examiner

METHOD AND APPARATUS FOR IMPROVING SPEECH INTELLIGIBILITY IN A ROOM

CROSS REFERENCE TO RELATED APPLICATION

This application claims priority under 35 USC 119 to German Patent Appl. No. 10 2021 103 310.1 filed on Feb. 12, 2021, the entire disclosure of which is incorporated herein by reference.

BACKGROUND

Field of the Invention

The invention relates to an apparatus and a method for improving speech intelligibility in a room, for example in a passenger compartment of an aircraft, land vehicle or sea vehicle.

Related Art

In many rooms in which there are people, there is not absolute silence but rather sounds are intentionally produced in the room or penetrate the room undesirably. As such, in motor-driven vehicles for transporting people, for example, sounds produced by the vehicle during operation enter the interior by different routes. The sound can be conducted by way of the air or can the enter the interior by way of the sound conduction in interconnected parts of the vehicle.

The interiors of modern vehicles have become much quieter during operation in comparison with earlier vehicles due to improved soundproofing measures. However, complete sound insulation of the passenger compartment often is not wanted for economic reasons. Additionally, a sound of some land vehicles is typical of a brand and is of considerable importance to driving feel in different driving situations.

Sounds produced by the operation of a vehicle depend on the source and may have only a single frequency or may be distributed over a narrow or wide frequency spectrum, for example as noise.

Sound sources, such as audio systems with sound transducers for reproducing music and speech, intentionally are put into operation in many rooms. Vehicles, such as land vehicles, often use sound transducers or other devices to produce a vehicle sound in the interior that is dependent on the respective driving situation, among other things.

Many rooms, including interiors of modern vehicles, use voice-controlled systems to control functions of technical systems arranged in or associated with the room. Moreover, multiple people in a room at the same time will normally converse with one another. For this reason, it is desirable to obtain background noise or an acoustic in the room that promotes good speech comprehension.

It is therefore an object of the invention to provide a method and an apparatus that, at least depending on the situation, intermittently and/or temporarily improve speech intelligibility in a room, in particular in a vehicle interior.

SUMMARY OF THE INVENTION

The human voice is produced by the interaction of the vocal folds in the larynx and the oral, pharyngeal and nasal cavities. A physical distinction can be made between four voice parameters: pitch, volume, tone and vowel sound. On account of the different size of the larynx and therefore the length of the vocal cords, the pitch of the fundamental tone for the male voice is approximately 125 Hz and approximately 250 Hz for the female voice. Small children have a register around 440 Hz. The vocal range is normally 1.3-2.5 octaves, but with training there is also the possibility of 3 or more. The frequency range of the human voice with the harmonics is approximately 80 Hz to 12 kHz. This frequency response contains frequency bins that are important to speech intelligibility, discernability of vowels and consonants, and brilliance and warmth.

Every person has an individual voice frequency profile in which the frequency and relative amplitudes of the fundamental tone and the harmonics differ from those of other people. Frequencies and frequency ranges that are different for every human being are particularly relevant to the speech intelligibility of the human being, while other ranges contribute to speech intelligibility only little or not at all.

The human ear has a sensitivity that varies over the entire frequency range. The ear is less sensitive to very low and very high sounds than to sounds in the central region of the auditory spectrum. Moreover, sounds at one frequency are obscured in the human ear by sounds at a frequency of sufficient amplitude situated next to the frequency in the frequency spectrum, that is to say are not heard. This phenomenon is also referred to as masking. The dashed line in FIG. 1 shows an illustrative hearing sensitivity curve for the human ear. The graph plots the sound pressure level required for consciously hearing the respective frequency over frequency. It can clearly be seen how the sensitivity decreases at low and high frequencies, and is at a maximum in the frequency range around approximately 3 kHz. FIG. 1 moreover shows a frequency referred to as "masker" just above 200 Hz with a sound pressure level of over 60 dB, and a signal next to it just above 400 Hz with a sound pressure level of approximately 20 dB. The masking signal affects a frequency range situated on either side, referred to as masking range in the FIG. 1, with the result that the signal situated next to the masking signal is not audible to a human being, that is to say is obscured or simply "masked". The masking effect of a noise is dependent on the amplitude difference and the frequency interval from an obscured sound.

If there is now noise in frequency ranges that contain frequencies, or frequency ranges, of a speaker that are important to speech intelligibility, this can lead to substantially reduced intelligibility of the words spoken by this speaker.

The invention uses this insight to improve speech intelligibility for individual speakers in a room having features or parameters that can be influenced at least within limits and determine the room acoustic. Such a room may be a vehicle interior. The term vehicle interior is used synonymously below for any room in which people are present and can speak, and the features or parameters of the room that determine the room acoustic can be influenced at least within limits. Within the context of this description, the term room acoustic covers not only sound propagation and reflection but in also noise of any kind, and the features or parameters that can be influenced can comprise apparatuses by means of which sound is intentionally introduced into the room, or sound transmitted into the room can be reduced, for example apparatuses for active noise reduction or apparatuses that have adjustable acoustic damping in the room.

According to the invention, a voice frequency profile is determined for individual speakers and used to ascertain frequencies or frequency ranges that are important to the speech intelligibility of that speaker. Determination of the voice frequency profile can comprise reading aloud a predetermined text, for example, and a corresponding sound recording of the text that has been read aloud is analyzed by an artificial intelligence or by machine learning to ascertain the relevant frequencies, or frequency ranges. At the same time, the face of the speaker is recorded using a camera and analyzed by means of an appropriate recognition method. As a result, the speaker can be identified as an individual, and also typical facial movements of the speaker when he or she is speaking are captured. Speaker-specific datasets then are available and contain a voice frequency profile for individual speakers, frequencies, or frequency ranges, relevant to speech intelligibility and typical facial movements when speaking.

The information obtained in this manner can then be stored and used in a method according to the invention for improving speech intelligibility in a room. Information can be stored in a storage medium that is connected to the room permanently or by way of a data connection, or in a portable storage medium that a speaker carries when he or she is in the room, for example in a memory of a key that the speaker can use to gain entry to the room, or in a mobile communication device that is uniquely associated with the speaker, for example a mobile phone or the like. The storage medium, or a device in which the storage medium is arranged, can communicate wirelessly with an apparatus provided in the room for improving speech intelligibility to provide the apparatus with the frequencies, or frequency ranges, relevant to speech intelligibility and with information relating to face recognition and typical facial movements of the individual.

The speaker-specific datasets can moreover be used to ascertain speaker-independent criteria for detecting a speaking individual without directly deriving a determination of the individual therefrom, for example facial movements, frequencies, or frequency ranges, or the like that are typical of a multiplicity of speakers.

A method according to the invention for improving speech intelligibility in a room comprises detecting an active speaker, or speech. This can be done, for example, with a camera to use previously ascertained speaker-independent typical facial movements and/or with one or more microphones arranged in the room that compare recorded sound signals with speaker-independent frequencies, or frequency ranges, and/or sounds that are typical of speech. The detecting does not necessarily already comprise identification of the speaker. What is important initially is a detection that an individual who is in the room is speaking.

Provided that a system carrying out the method knows the individual or individuals who are in the room, it is possible for criteria specific to the individual or individuals who are in the room to be used for detecting a speaking individual instead of the speaker-independent criteria, thereby improving detection accuracy further.

After an active speaker, or speech, has been detected, the speaker, i.e the speaking individual, is identified. In this context, identifying means that a dataset related to the speaking individual can be retrieved, and the dataset comprises at least the frequencies, or frequency ranges, that are relevant to speech intelligibility. Further identification in the conventional sense, that is to say for example associating a name and the like, is not required. The individual can be identified by comparing speech recorded by at least one microphone arranged in the room with speech profiles of individuals obtained from a memory. Preferably, only speech profiles of individuals who are known to be present in the room, for example because they had already been in the room beforehand, or because their presence was communicated to a system carrying out the method by another route, for example by a calendar entry, are obtained in this case. Other ways of detecting the presence of individuals can also comprise the evaluation of wireless communication of devices that the individuals carry and that are associated with said individuals, for example mobile phones that connect to communication networks that can be associated with the room.

The actively speaking individual can also be identified in a fundamentally known manner by comparing a face recorded by a camera arranged in the room with faces retrieved from a database, for example from datasets that contain voice frequency profiles and/or frequencies, or frequency ranges, that are relevant to speech intelligibility and facial movements that are typical when speaking.

If the position of individuals in the room is essentially invariable, for example in case of vehicle occupants, who are normally at the same location in the room for a relatively long period, and if the identity of the individuals in the room is known, for example after a determination that has already taken place beforehand, the speaker can be identified simply by detecting speech at the position of a speaker. The position can easily be detected in a known manner from a camera image in which facial movements that are typical of an individual when he speaks are sought, and/or by way of an analysis of the sound level and/or the phase of the sound by means of a microphone arrangement comprising at least two microphones.

In one or more configurations, the detection of an active speaker, or of speech, and/or the identification of the speaking individual can involve not only the evaluation of camera images and/or the evaluation of sounds recorded by one or more microphones but also additional signals provided by sensors arranged in the room being used, for example in order to speed up the evaluation. These additional signals can be signals from a seat occupancy detection system of a vehicle, for example, which are used to control airbags or for belt alerts, among other things. The evaluation can then omit the areas that are known to have nobody present in them, with the result that false detection in these areas can be prevented.

When the speaker has been identified, at least one apparatus for producing sound for the room is influenced in such a way that the level of sound emitted into the room by this apparatus is reduced at frequencies or in frequency ranges that tally with or are adjacent to the frequencies, or frequency ranges, of the speaker that are relevant to speech intelligibility.

In one or more configurations of the method, there is provision in the room for an apparatus for active noise reduction. Such apparatuses use microphones to record noise in surroundings and themselves produce corresponding noise that, for at least one location or area in the room, has a phase of at least approximately the same amplitude but rotated through 180°. The sound waves that are present with approximately the same amplitude for the at least one location or area in the room cancel one another out completely or at least to a great extent by means of destructive interference. Depending on the frequency of the noise and based on the design of the apparatus, a significant reduction in noise can be achieved for multiple locations or areas in the room. Accordingly, the method alternatively or additionally comprises influencing at least one apparatus for producing sound for the room or for altering acoustic features or parameters of the room in such a way that the audible level of sound transmitted into the room is reduced by destructive interference or damping in particular at the frequencies, or in the frequency ranges, that are relevant to the speech intelligibility of the speaker, or are adjacent to said frequencies or frequency ranges. The reduction in the sound by destructive interference or damping at the frequencies, or in the frequency ranges, that are relevant to speech intelligibility can be at the expense of reduction at other frequencies, or in other frequency ranges. The at least one apparatus for producing sound for the room and/or the at least one apparatus of acoustic features or parameters of the room, which ultimately brings about a reduction in the level of sound transmitted into the room, can comprise for example loudspeakers of known design that emit sound into the room, or actuators that configure or prompt parts of the room structure, room panelling, room linings, room cladding or room coverings to emit sound or damp sound waves.

To influence the at least one apparatus, a dataset related to the identified speaking individual can be obtained that comprises at least the frequencies, or frequency ranges, that are relevant to speech intelligibility. As already mentioned previously, the dataset can be obtained from a storage medium that is situated in or associated with the room or from a database arranged remotely from the room. The dataset can preferably be obtained wirelessly, and at least part of the dataset can be at least temporarily stored in the at least one apparatus.

The reduction in audible sound at the frequencies, or in the frequency ranges, that are relevant to speech intelligibility advantageously leads to the risk that these frequencies, or frequency ranges, will be masked by extraneous sound being reduced, or prevented completely, with the result that individuals who are also traveling or individuals who are listening via a voice communication connection can understand what is being spoken better.

In one or more configurations of the method, the at least one apparatus for producing sound for the room is influenced in such a way that the level of the sound emitted by this apparatus is reduced in particular at the locations in the room at which there is a possible audience. The same applies to the sound transmitted into the room being reduced by destructive interference. Locations in the room at which there is a possible audience can be detected by evaluating camera images, for example. In a vehicle interior, this can also be done by evaluating signals from a seat occupancy detection system.

In one or more configurations of the method, delayed and/or correct-phase reproduction of speech recorded by at least one microphone in the room by way of at least one apparatus for producing sound that is arranged in the room takes place in addition to the reduction of the sound that is not coming from speech. The reproduction can preferably take place in particular for one or more areas of the room in which there is a possible audience. A possible audience can be located for example by analyzing camera images, or by means of additional signals from sensors arranged in the room, for example seat occupancy detection signals in vehicles. For the reproduction of speech, the level can be raised at the frequencies, or in the frequency ranges, that are relevant to speech intelligibility. These configurations can achieve the improvement in speech intelligibility even in surroundings in which passive sound-damping apparatuses, for example paneling and the like, damp frequencies, or frequency ranges, that are relevant to speech intelligibility to a particular degree.

An apparatus for improving speech intelligibility in a room comprises not only a detection apparatus designed to detect an active speaker, or speech, but also an identification apparatus designed to identify an active speaker, and at least one apparatus for producing sound and/or for altering acoustic features or parameters of the room. The apparatus according to the invention for improving speech intelligibility further comprises a control apparatus that actuates the at least one apparatus for producing sound and/or for altering acoustic features or parameters of the room in such a way that the level of sound transmitted into the room by this apparatus is reduced at frequencies or in frequency ranges that tally with or are adjacent to the frequencies, or frequency ranges, of the speaker that are relevant to speech intelligibility and/or in such a way that sound transmitted into the room is reduced at the frequencies or in the frequency ranges that are relevant to the speech intelligibility of the speaker or at frequencies or in frequency ranges that are adjacent to said frequencies or frequency ranges.

The detection apparatus and/or the identification apparatus can comprise one or more cameras and/or microphones, the signals from which are supplied to a computer. The computer can implement the control apparatus at the same time. The sound producing apparatus and/or the apparatus for altering acoustic features or parameters of the room can comprise loudspeakers having appropriate amplifiers, but also apparatuses that are associated with or arranged in the room and that can be used to actively adjust a damping of sound at different frequencies, or in different frequency ranges. The computer executes a computer program that causes the computer to carry out one or more configurations and further developments of the method described above.

Accordingly, a computer program product according to the invention comprises instructions that, when executed by a computer, cause said computer to carry out one or more configurations and further developments of the method described above.

The computer program product can be stored on a computer-readable medium, or data medium. The medium, or the data medium, can be in a physical embodiment, for example as a hard disk, CD, DVD, flash memory or the like, but the medium, or the data carrier, can also comprise a modulated electrical, electromagnetic or optical signal that can be received by a computer by means of an appropriate receiver and stored in the memory of the computer.

DESCRIPTION OF EXEMPLARY EMBODIMENTS

Figure 1:
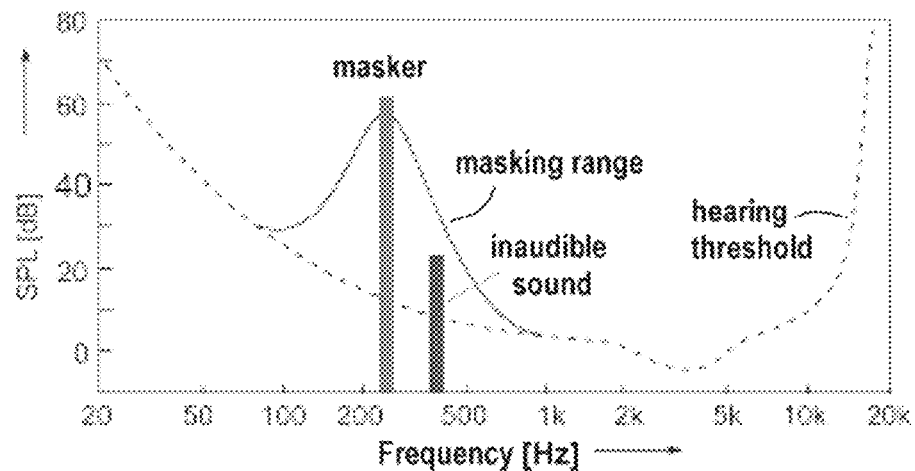
FIG. 1 shows a representation of the hearing range of the human ear with a sound that is obscured by a masking sound and is therefore no longer audible to human beings.
Figure 2:
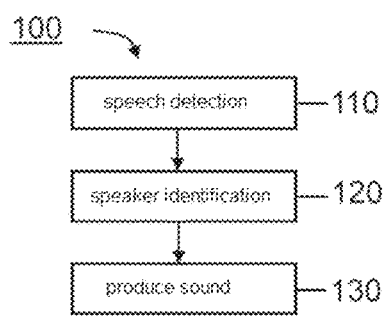
FIG. 2 is a simplified schematic flowchart for the method according to the invention.
Figure 4:
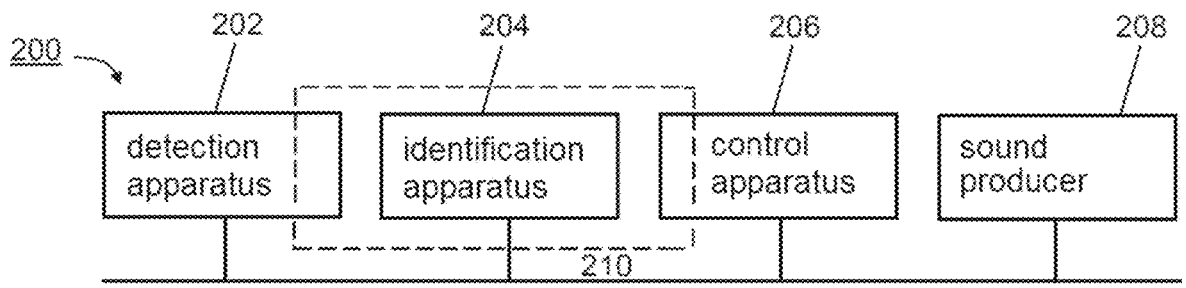
FIG. 4 is schematic block diagram of an apparatus according to the invention for improving speech intelligibility in a room.

FIGS. 2-4 schematically illustrate an embodiment of the invention. The elements shown in the figures may be implemented in various forms of hardware, software or combinations thereof. Preferably, these elements are implemented in a combination of hardware and software on one or more appropriately programmed general-purpose devices that may include a processor, memory and input/output interfaces. The term "connected" as used herein is defined to mean directly connected to or indirectly connected with through one or more intermediate components. Such intermediate components may include both hardware and software-based components.

It will be appreciated by those skilled in the art that the block diagrams presented herein represent conceptual views of illustrative components embodying the principles of the disclosure. Similarly, any functions or methods implied by these block diagrams may be represented in computer readable media and so executed by a computer or processor, whether or not such computer or processor is explicitly shown FIG. 2 is a simplified schematic flowchart for the method 100 according to the invention for improving speech intelligibility in a room. In step 110, an active speaker, or speech, in the room is first detected, i.e. it is established that an individual who is in the room is speaking. The detection of an active speaker, or of speech, can comprise for example detecting frequencies and/or sounds that are typical of human speech by means of at least one microphone in the room and/or detecting facial movements of persons that are typical of speech by means of one or more cameras covering the room.

Subsequently, in step 120, the speaker is identified, i.e the identity of the speaking individual is determined at least insofar as a dataset related to the speaking individual can be retrieved that comprises at least the frequencies, or frequency ranges, that are relevant to speech intelligibility. The identifying can comprise for example comparing speech recorded by the at least one microphone with speech profiles of persons that are obtained from a memory and/or comparing faces with representations of faces for which voice profiles are stored that are stored in a memory.

Finally, in step 130, at least one apparatus for producing sound for the room is influenced in such a way that the level of sound emitted into the room by this apparatus is reduced at frequencies or in frequency ranges that tally with or are adjacent to the frequencies, or frequency ranges, of the speaker that are relevant to speech intelligibility. Alternatively or additionally, at least one apparatus for producing sound for the room can be influenced in such a way that a sound transmitted into the room is reduced by at least one apparatus for reducing sound by means of destructive interference at the frequencies or in the frequency ranges that are relevant to the speech intelligibility of the speaker or at frequencies or in frequency ranges that are adjacent to said frequencies or frequency ranges.

Figure 3A:
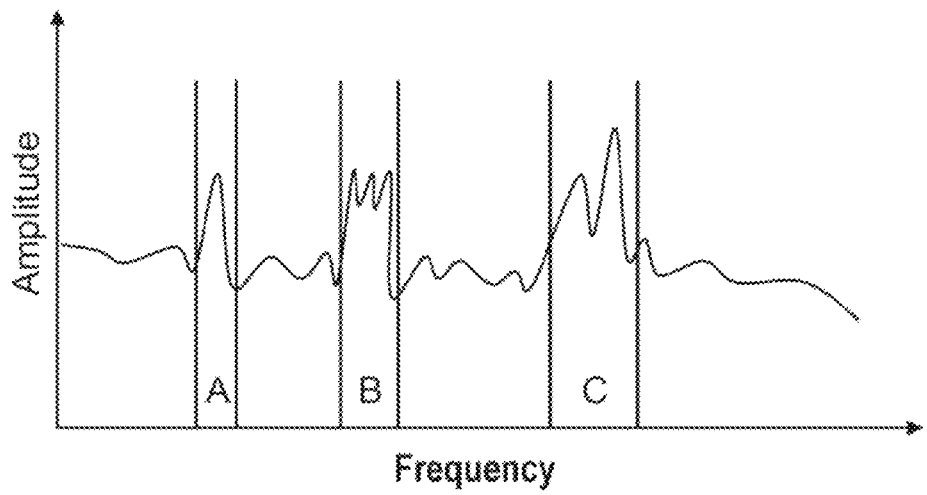
FIG. 3a is a representation of a voice frequency profile of an individual with frequencies, or frequency ranges, that are relevant to speech intelligibility.

FIG. 3a is an illustrative representation of a voice frequency profile of an individual as an amplitude characteristic over frequency. The frequencies, or frequency ranges, A, B and C that are relevant to speech intelligibility are clearly discernible and have higher amplitudes than the other frequencies.

Figure 3B:
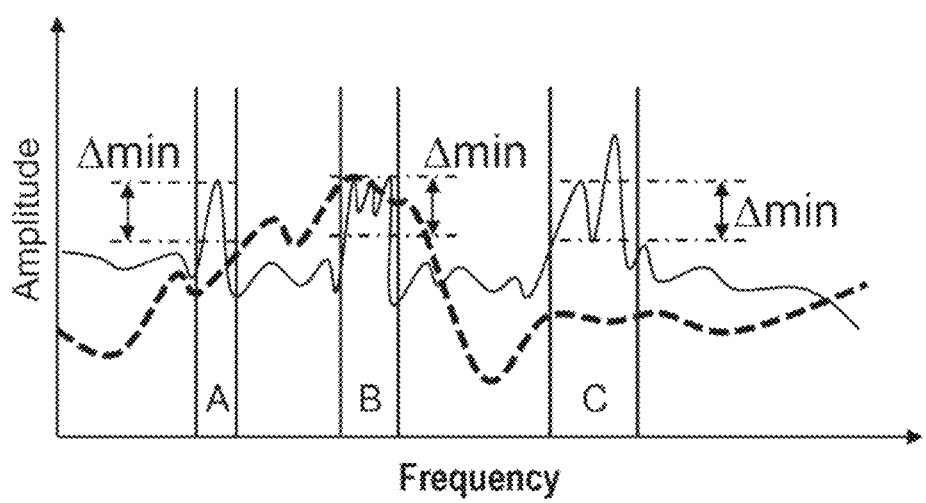
FIG. 3b shows the representation of the voice frequency profile of FIG. 3a with an overlaid frequency profile of illustrative noise

FIG. 3b shows the representation of the voice frequency profile from FIG. 3a with an overlaid frequency profile of an illustrative noise. The noise is represented as a line in bold dashes. Good speech intelligibility requires the level of speech to be above that of noise by a minimum value, for example 9 dB. The minimum interval for each of the frequencies, or frequency ranges, that are relevant to speech intelligibility is shown by the dashed Δmin signal-to-noise ratio limits in the figure. It can clearly be seen that the minimum interval between noise and speech is not observed in the frequency range denoted by B. On the contrary, this frequency range is almost completely obscured by the noise.

Figure 3C:
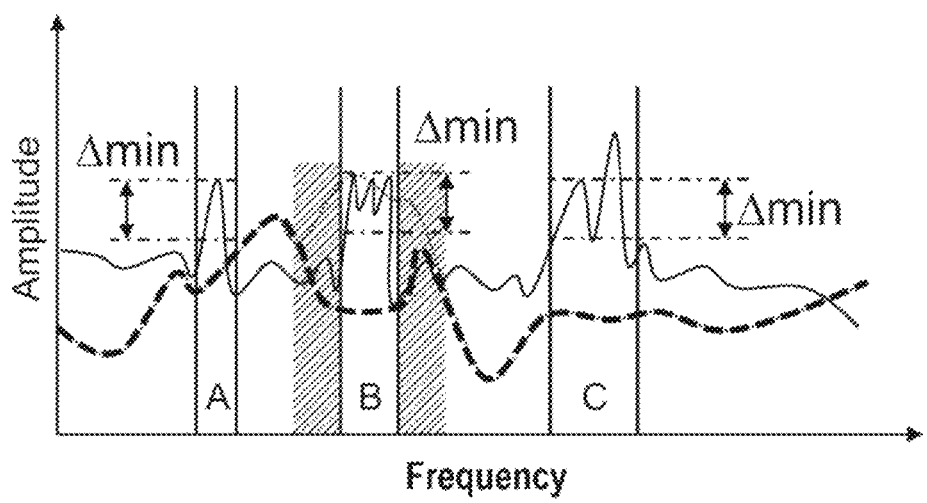
FIG. 3c is an exemplary illustration of the effect of the invention on the frequency profile of the noise shown in FIG. 3b.

FIG. 3c is an exemplary representation of the effect of the invention on the frequency profile of the noise shown in FIG. 3b. Whereas the level of speech is at a sufficient interval from the noise in frequency ranges A and C, which means that no intervention was necessary here, active influencing of the source of the noise, or active reduction of the noise, in frequency range B and in the shaded frequency ranges situated next to the frequency range B has reduced the level of the noise, with the result that the level of speech is now at a sufficient interval from the level of the noise. Reducing the level of the noise in the shaded areas also prevents possible masking effects as a result of interfering frequencies situated close to the relevant frequency range. To illustrate the effect, the original level of the noise is shown as a dotted line in the FIG. 3c.

FIG. 4 is an illustrative and schematic block diagram of an apparatus 200 according to the invention for improving speech intelligibility in a room. A detection apparatus 202, an identification apparatus 204, an apparatus 208 for producing sound and/or for altering acoustic features or parameters of a room and a control apparatus 206 are connected to one another via one or more data or control lines or buses 210. The detection apparatus 202, the identification apparatus 204 and the control apparatus 206 can use one or more of their components jointly, as indicated by the dashed box in the figure.

The invention described above allows speech intelligibility in a room to be improved on a speaker-specific basis, regardless of whether two or more individuals are in the room and speaking to one another, or whether an individual who is in the room is making a telephone call or "holding" a conversation with a voice controller of an apparatus. Sound producing apparatuses intentionally used for producing sound for the room can largely continue to be operated in this case, for example an audio system or the like. Similarly, apparatuses intentionally used to lower the level of noise entering the room can continue to be operated such that the effect of said apparatuses is not disruptive during a conversation, but a lowering of the level of noise is nevertheless achieved generally.

LIST OF REFERENCE SIGNS 100 method
110 speaker detection
120 speaker identification
130 influencing of room acoustic
200 apparatus
202 detection apparatus
204 identification apparatus
206 control apparatus
208 apparatus for producing sound for a room
210 data/control lines or buses
A . . . C frequencies, or frequency ranges, relevant to speech intelligibility

What is claimed is:

1. A method (100) for improving speech intelligibility in a passenger compartment of a motor vehicle, comprising:
using a seat occupancy detection apparatus to identify where in a passenger compartment passengers are seated;
detecting (110) an active speaker, or speech, in the passenger compartment;

identifying (120) a voice frequency profile for the active speaker;

identifying where in the passenger compartment the active speaker is located based on the seat occupancy detection apparatus and further based on at least one of a camera or a microphone;

influencing (130) at least one apparatus for producing sound in the passenger compartment in such a way that a level of sound emitted into the passenger compartment by the apparatus is reduced at frequencies or in frequency ranges that coincide with or are adjacent to the frequencies, or frequency ranges, of the speaker that are relevant to speech intelligibility; and altering acoustic features or parameters of at least one structure, panelling, linings, cladding or coverings in the passenger compartment in such a way that sound transmitted into the passenger compartment of the motor vehicle is reduced or damped by this altering of the structure or panelling at the frequencies or in the frequency ranges that are relevant to the speech intelligibility of the speaker, or at frequencies or in frequency ranges that are adjacent to said frequencies or frequency ranges, by means of this altering of the at least one structure, panelling, linings, cladding or coverings in the passenger compartment.

2. The method of claim 1, wherein the at least one of a camera or a microphone comprises at least one microphone, and the detecting (110) of an active speaker comprises:

using the at least one microphone in the passenger compartment for detecting frequencies and/or sounds that are typical of human speech and for confirming where in the passenger compartment the frequencies or sounds that are typical of human speech are coming from.

3. The method of claim 1, wherein the at least one of a camera or a microphone comprises at least one camera, and the detecting (110) of an active speaker comprises:

using the at least one camera in the passenger compartment for detecting facial movements of persons that are typical of speech and for confirming where in the passenger compartment the active speaker is located.

4. The method of claim 1, wherein the at least one of a camera or a microphone comprises at least one microphone, and identifying (120) a voice frequency profile for the active speaker comprises:

comparing speech recorded by at least one microphone arranged in the passenger compartment with speech profiles of persons that are obtained from a memory.

5. The method of claim 1, wherein the at least one of a camera or a microphone comprises at least one camera, and identifying (120) the active speaker comprises:

comparing a face recorded by at least one camera arranged in the passenger compartment with representations of faces for which voice profiles are stored in a memory.

6. The method of claim 1, wherein the detection of an active speaker, or detection of speech, and/or the identification of the speaking individual further involves evaluation of additional signals provided by sensors arranged in the passenger compartment.

7. The method of claim 1, wherein the at least one apparatus for producing sound in the passenger compartment is influenced in such a way that a level of the sound emitted by the apparatus is reduced, and/or sound is reduced by destructive interference at least at locations in the passenger compartment at which the seat occupancy detection apparatus has identified a passenger other than the active speaker.

8. The method of claim 1, wherein the at least one of a camera or a microphone comprises at least one microphone, and the method further comprising delayed and/or correct-phase reproduction of speech recorded by the at least one microphone in the passenger compartment by way of an apparatus for producing sound that is arranged in the passenger compartment.

9. The method of claim 8, wherein the delayed and/or correct-phase reproduction of speech is performed in one or more areas of the passenger compartment in which the seat occupancy detection apparatus has identified a passenger.

10. The method of claim 1, further comprising:

determining a voice frequency profile of a speaker, ascertaining frequencies, or frequency ranges, that are important to the speech intelligibility of the speaker, determining features of the face of the speaker that are suitable for identifying the speaker and typical facial movements of the speaker when speaking, and storing in a memory the ascertained voice frequency profile and/or frequencies, or frequency ranges, important to the speech intelligibility of the speaker and the features of the face of the speaker that are suitable for identifying the speaker and the typical facial movements of the speaker when speaking, wherein the memory can be accessed by an apparatus for improving speech intelligibility in the passenger compartment, and wherein the apparatus is arranged in or associated with the passenger compartment.

11. The method of claim 1, wherein the at least one of a camera or a microphone comprises at least one microphone and wherein the step of influencing (130) at least one apparatus for producing sound in the passenger compartment comprises reproducing the speech detected by the microphone while simultaneously reducing, by destructive interference sound that is not identified as speech.

* * * * *